United States Patent

[11] 3,608,994

[72] Inventor James A. McDonnell
Binghamton, N.Y.
[21] Appl. No. 819,679
[22] Filed Apr. 28, 1969
[45] Patented Sept. 28, 1971
[73] Assignee International Business Machines Corporation
Armonk, N.Y.

[54] HOLOGRAPHIC INFORMATION STORAGE-AND-RETRIEVAL SYSTEM
3 Claims, 4 Drawing Figs.
[52] U.S. Cl. .................................................. 350/3.5,
350/162 SF
[51] Int. Cl. ..................................................... G02b 27/22
[50] Field of Search ............................................ 350/3.5,
DIG. 1, 162

[56] References Cited
UNITED STATES PATENTS
3,408,143  10/1968  Mueller .................. 350/162 UX OTHER REFERENCES
Megla, " Optical Properties and Applications of Photochromic Glass," 5 Applied Optics 957–960 (6/1966)

Primary Examiner—David Schonberg
Assistant Examiner—Robert L. Sherman
Attorneys—Hanifin and Jancin and Andrew Taras ABSTRACT: The invention concerns an information retrieval system in which a hologram is utilized as a mass-storage media that is scanned by means of a laser beam. The information which is retrieved is read out onto a photodiode array. Interposed between the hologram and the photodiode array is a key in the form of a spatial filter. When correlation is secured between the key and the information scanned in the hologram, an output beam is directed through the filter and onto the photodiode array.

A second hologram is further interposed between the filter and the first hologram to provide for conversion to a single font when different fonts are employed in the first hologram.

HOLOGRAPHIC INFORMATION STORAGE-AND-RETRIEVAL SYSTEM

BACKGROUND OF THE INVENTION

The present-day storage media, for example drums, tapes and cores, have been successfully employed in so-called medium-size storage systems with relatively slow to fast access times. For high-volume information storage systems, however, the cost and the size of the above systems are prohibitive.

Improvements in holographic techniques coupled with the improvements in the laser technology have led to developments which make feasible high-volume-storage-retrieval systems with considerable reduction in size and cost over prior art systems.

STATEMENT OF OBJECTS

The principal object of the invention is to provide a high-volume fast-access information storage retrieval system which is superior and more economical than the prior art retrieval systems.

Another object is to provide a high volume information storage system from which information is retrieved by means of a unique information-correlating system that is faster than the information-retrieval systems of the prior art.

Another object is to provide an information-retrieval system in which the stored information appears in a variety of different fonts.

Yet another object is to provide a highly sophisticated holographic information storage system having all the desirable attributes of an associative memory, and also to provide a direct-document-entry device.

The foregoing and other objects, features and advantages of the invention will be apparent from the following more particular description of preferred embodiments of the invention, as illustrated in the accompanying drawings.

DESCRIPTION OF THE DRAWINGS

Referring to FIG. 1, a scanlaser 1, or other coherent scannable light source, directs a beam 2 by way of a lens 3, upon a selected hologram of a plurality of holograms 4-*l* through 4-*n* located on a holoarray 4. A diffraction pattern of the image of the information in the selected hologram is directed at the plane of a transforming lens 6 directly, or, by means of a coupling device, whose function will be explained later hereinafter. The transforming lens 6 projects the Fourier transform of the information through a spatial filter 7 located at the focal point of the transforming lens 6. The spatial filter 7 is a vector function of the information contained thereon. The transmission characteristics of the filter 7 modulate the information contained in the impinging light by the product of the impinging light vector with the filter vector at all points. The product of the modulated light is then directed through a lens 8 which yields the inverse Fourier transforms to provide a convolution expressed as:

$$V(x,y) = \frac{1}{4\pi^2} \int \int_{-\infty}^{+\infty} F(p,q) H^*(p,q) e^{i(px+qy)} dp dq$$

wherein
$V(x, y)$ — the function which is the text in terms of optical density
$F(p, q)$ — Fourier transform of $V(x, y)$
$H^*(p, q)$ — Complex conjugate of the Fourier transform of the key
$e^{ipx}$ — $\cos px + i \sin px$, the Fourier kernel When the filter is constructed to recognize a specific pattern of information, for example a specific word of information, a spot of light is projected on an image plane 9 at a point corresponding to the location occupied by the hologram containing that word in the holoarray 4 in which a complete text of information is recorded. The text, for example, may be the contents of hundreds of issues of a well-known scientific periodical. A 3-inch square array of holograms stored in the holoarray 4 can conveniently store well over 5 million characters of information which would be sufficient to store the text of the above scientific periodical. The projection of the images in the image plane 9 may be directed through an appropriate optical system onto a photodiode array in a conventional manner.

Figure 2:
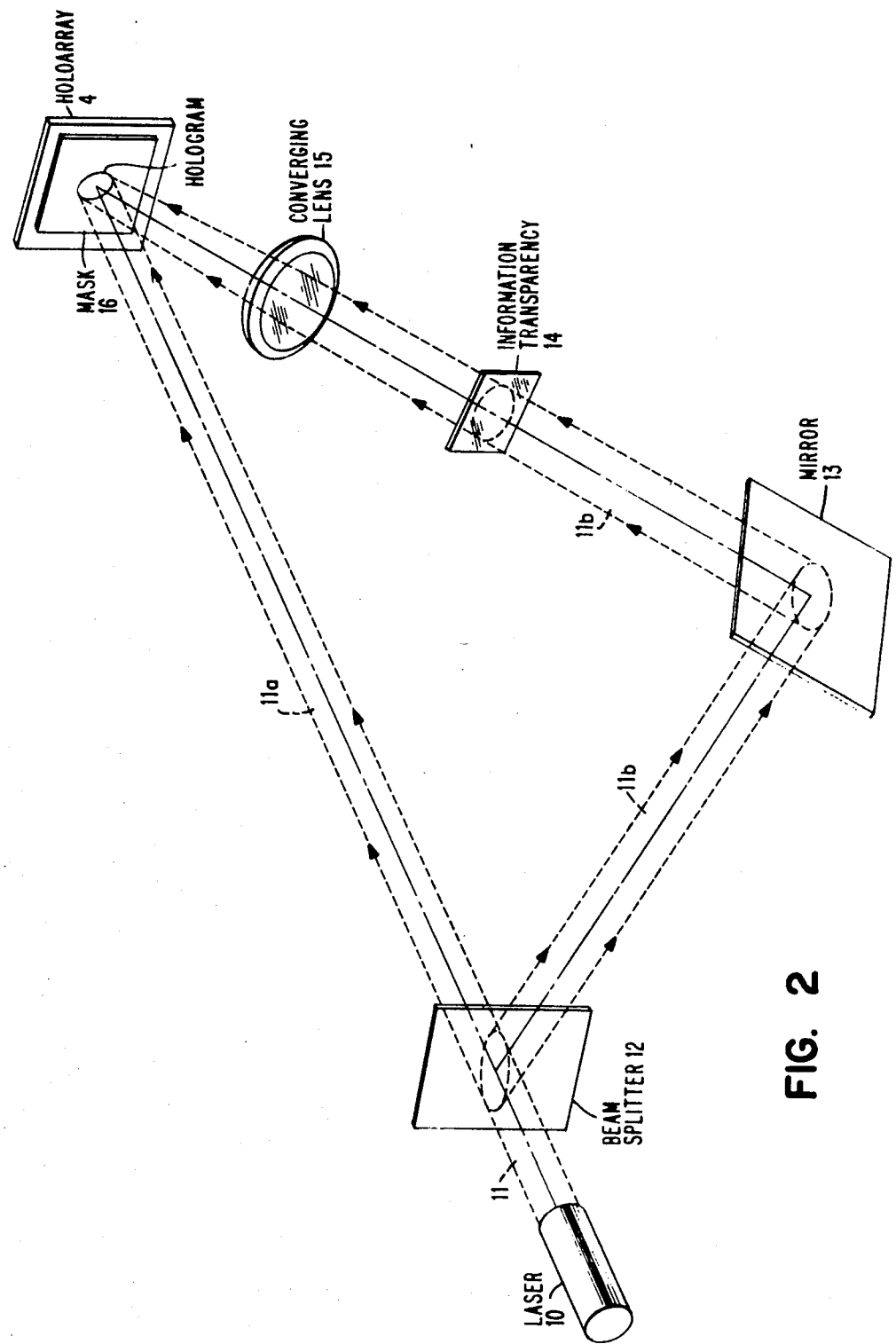
FIG. 2 shows apparatus for constructing the hologram used in the arrangement of FIG. 1.

The method of constructing a holoarray 4 may be described with the aid of FIG. 2 to which reference is now invited. The information to be stored in the various holograms 4-*l* through 4-*n* in the array 4 are entered by way of a photographic transparency 14, a different transparency being utilized for recording each of the individual holograms on the array 4. A mask 16 is utilized to select each specific area for the recording includes a laser source 10 which issues a coherent beam 11 that is divided into a reference beam 11*a* and an information beam 11*b* by means of a beam splitter 12. By virtue of the latter in combination with a mirror 13 the beams 11*a* and 11*b* are directed to intermix to form interference patterns which are recorded upon successively exposed sensitive surfaces of a hologram film which, when photographically developed, produces the holoarray 4. Suitable mechanical apparatus which provides *x*-*y* coordinate motion in the plane of the hologram is employed to obtain successive exposures of the hologram film. The information entered into the information beam as mentioned above, is determined by the information transparency 14. A lens 15 is interposed between the transparency 14 and the hologram to cause convergence of the information beam. The information beam is thereby focused and intermixes with the reference beam 11*a* to form the interference patterns, each different transparency providing a different interference pattern.

Figure 4:
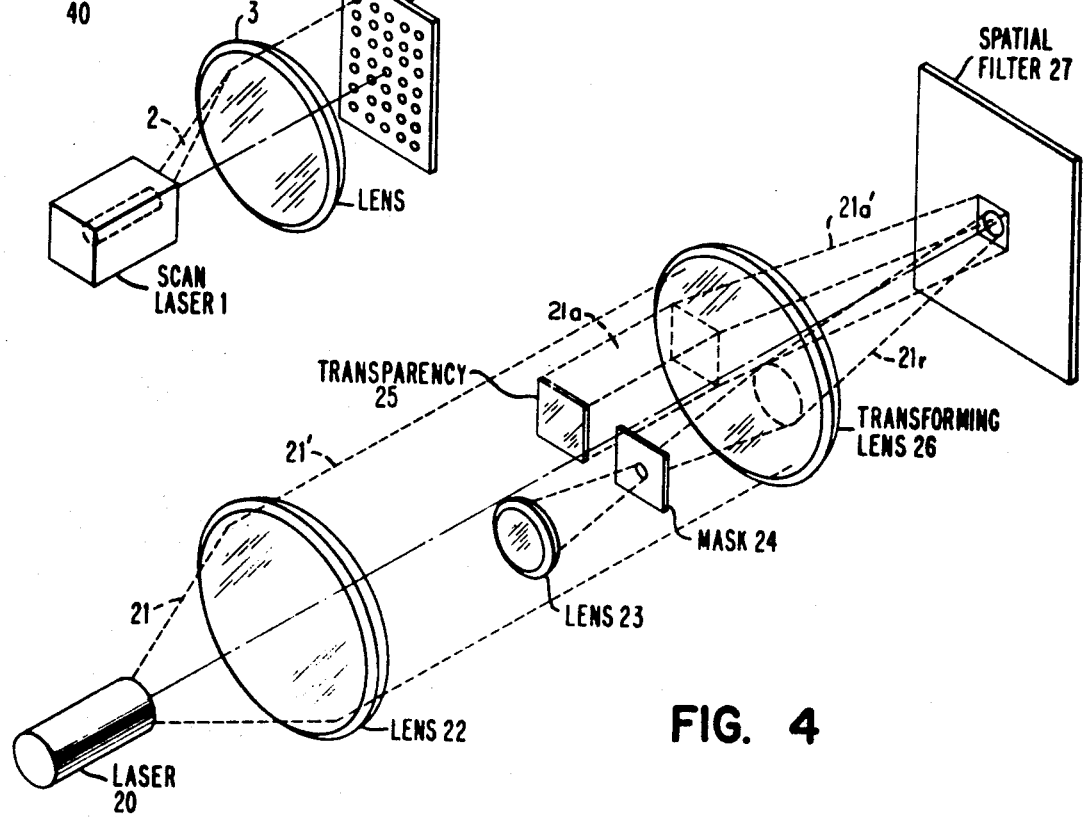
FIG. 4 shows apparatus for constructing a spatial filter.

The method of constructing the spatial filter is shown in FIG. 4 wherein a laser source 20 issues a coherent beam 21 directed through a lens 22 to produce a collimated coherent beam 21'. Between the lens 22 and a transforming lens 26 are disposed, in the manner shown, a lens 23, mask 24, and a transparency 25, the mask 24 and the transparency 25 being located in a plane different from the plane in which the lens 23 is located. A portion of the beam 21' is modulated by the information contained in the transparency 25 to produce a modulated beam 21*a* which, when passed through the lens 26, emerges as a converging beam 21*a'*, the latter containing the Fourier transform of the spatial vector function of the information contained in the transparency 25. This spatial vector function is summed with the reference vector represented by the reference beam 21*r* and the interference pattern resulting therefrom is recorded on the sensitive surface of the spatial filter 27. The reference beam 21*r* is produced from the beam 21' by means of the lens 23 and the mask 24. The spatial filter 27 corresponds to the filter 7 shown in FIG. 1.

Figure 3:
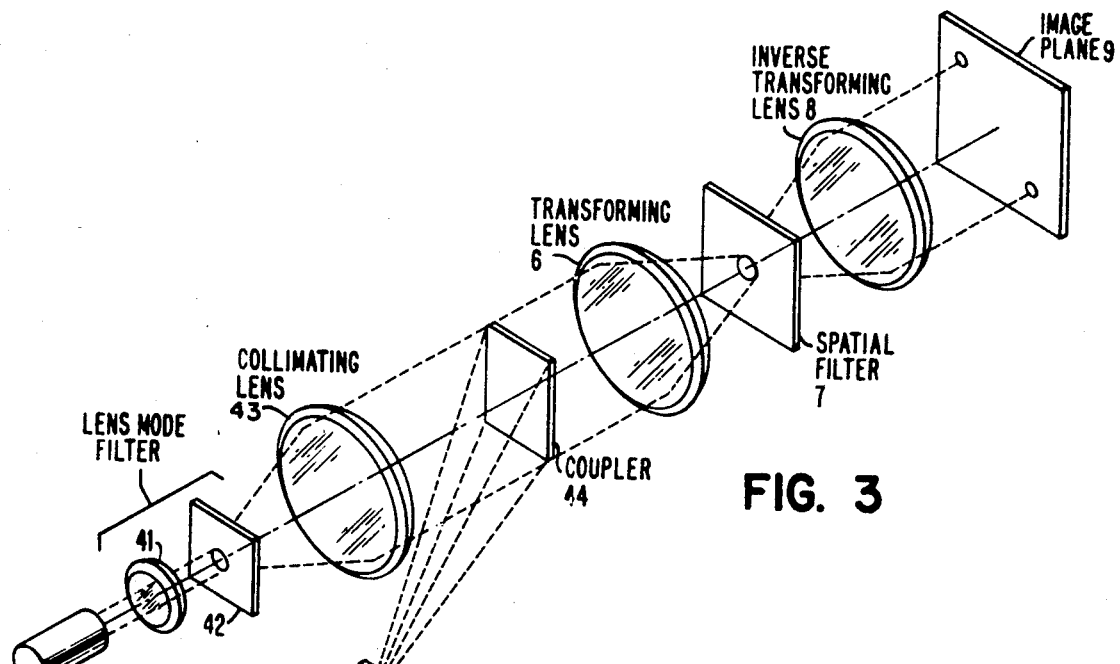
FIG. 3 shows an alternative embodiment of the holographic storage retrieval system.

The technique for implementing a text search will now be described in connection with the arrangement shown in FIG. 3. The text to be searched is contained in the holoarray 4 comprised of individual holograms 4-*i* through 4-*n*. A scanlaser 1 provides a coherent beam 2 of a frequency $f_1$ which is selectively directed through lens 3 to impinge upon a selected hologram, an image of the latter's text is directed upon a coupler 44 constituted of a material having photochromic properties responsive to the specific frequency $f_1$ for storing the text image. Photochromic materials in general change transmission with the application of one frequency, revert with another and are insensitive to a third. In this particular embodiment, $f_1$ is chosen to change the transmission of the photochromic material in accordance with the image obtained from the hologram. This pattern is then diffracted by $f_1$, chosen so that the photochromic material is insensitive to it. The remaining structure of the arrangement in FIG. 3 is substantially similar to that shown and described in connection with FIG. 1. This structure includes laser 40, a mode filter arrangement constituted of lens 41, filter 42 and collimating lens 43, that provides a collimated coherent beam of frequency $f_2$ which is different from the frequency generated by laser 1. By virtue of frequency $f_2$ the latent image in the coupler is read out and directed through lens 6 and onto the spatial filter 7. If the key information in the filter 7 is identical to (or matches) the corresponding information word in the imaged text, the filter 7 yields an output, in the manner described in connection with FIG. 1, that is directed through the lens 8 that performs an inverse transforming function of the text and results in the projection of a spot of light on the image plane 9 at a location thereon corresponding with the location of the selected hologram in the holoarray 4. Continued scanning of the holoarray 4 during the course of the text search, should other matches occur between the key in the filter 7 and selected holograms, will yield light spots in appropriate locations on the image plane 9.

The locations of the various output points on the image plane relative to the optical axis of the image plane correspond to locations of the key works in the text in the selected holograms.

Erasure of the image on the coupler can be accomplished in various ways. One way, for example, would be to apply a third frequency $f_3$ to the coupler by an appropriate mode filter associated with the laser 40. The application of this frequency $f_3$ causes erasure of the text image by restoring the medium to its original state.

The image of the text on the coupler can be in either positive or negative form depending upon whether the hologram is made from a positive or negative transparency.

As previously mentioned, the invention has all of the desirable attributes of an associative memory. An associative memory is defined as one which is content addressable rather than location addressable. For example, to locate the personnel record of John Doe, in an associative memory the input would be the letters "johndoe," while in a conventional memory it would be a numerical location address, for example "942." The conventional memory may be searched in connection with the system shown in FIG. 1. Assuming that the complete record of John Doe in the core memory is to be extracted, and further assuming that the holoarray 4 contains a complete text of the data stored in the conventional core memory, the record of John Doe is then extracted from the core memory by placing the name John Doe in the spatial filter 7 and, in the manner described, scanning the holoarray 4. When the name John Doe is encountered in the text, a spot of light appears in the plane 9. With the presence of a suitable lens system and a photodiode array in front of plane 9 and with a suitable addressing means interconnecting the core memory and the diode array, the complete record of John Doe will be addressed and extracted in a manner well known in the computer art.

One of the difficulties encountered in text search is the presence of multiple type styles or fonts. Fonts differ primarily in the serifs, or embellishments, added to a basic font shape, which is relatively standard. While the basic shape is reasonably standard, it may vary in size, tilt and aspect ratio (height-to-width ratio).

A spatial filter can be used to extract the basic shape from a multiplicity of fonts by eliminating all frequency components except those which contribute to the basic shape. The basic shape is contained in the middle frequencies, the serifs are in the high frequencies and the low frequencies provide contrast. The line width of the basic shape is also an important parameter to consider in determining which bands contribute to the basic shape.

Figure 1:
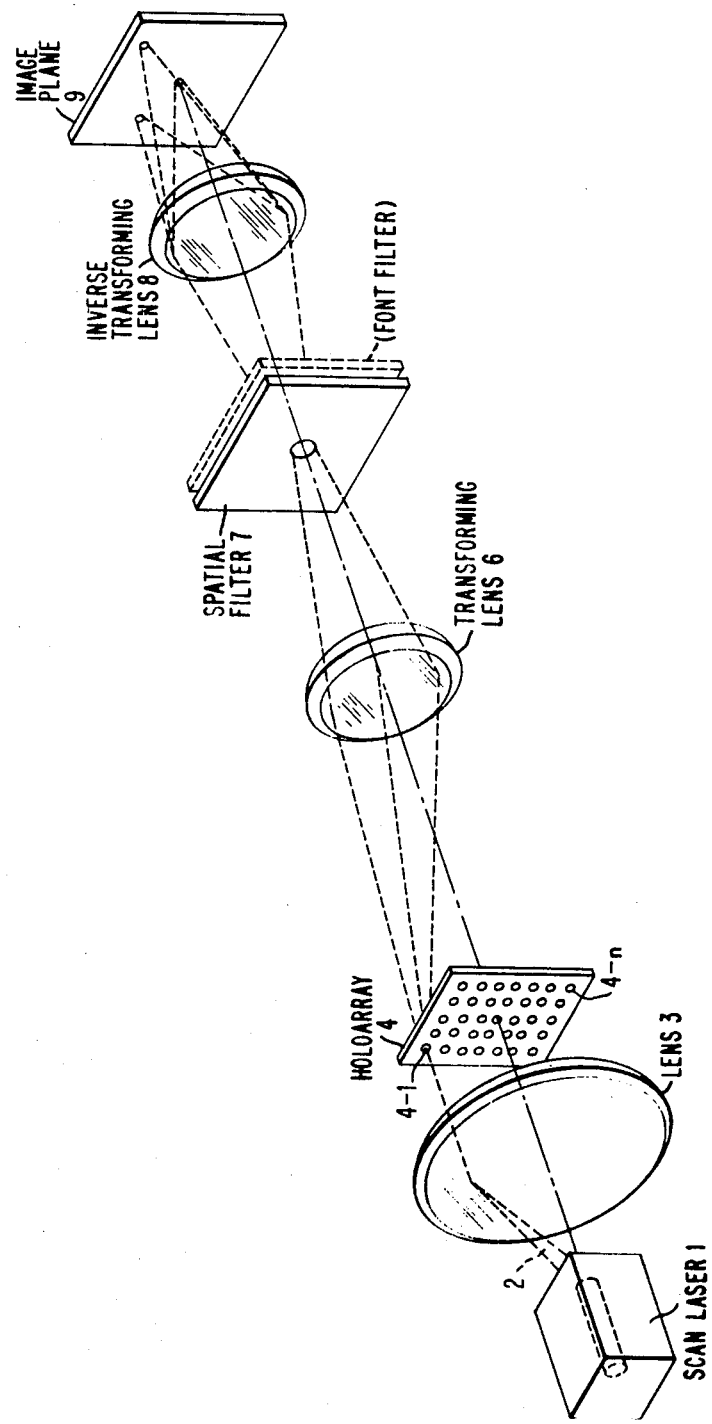
FIG. 1 is a general arrangement of the holographic storage retrieval system.

In any spatial filter the zero frequency is on the optic axis and frequency increases radially. Since most type styles are higher than wide, the bands eliminated will differ in the vertical and horizontal directions. In the embodiment of FIG. 1, the font filter should be located in proximity to the spatial filter 7 or in the same plane if possible.

Variations in font sizes can be compensated for by magnification, aspect ratio by a cylindrical lens, and tilt by rotating and tilting the plane in which the text is located.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A holographic system for storing and retrieving information, comprising:
   a first optical system including a coherent source for issuing a coherent light beam;
   a second optical system including a holoarray containing a plurality of holograms each storing different text portions of said information, a scanning laser for selectively scanning said holoarray and providing information beams containing images of said text portions of said information;
   a coupler forming a part of said first optical system for receiving and storing the images of said information beams;
   a lens forming part of said first optical system and disposed in the path of said coherent light beam for directing a collimated beam through the images stored in said coupler and providing a diffracted output beam;
   a filter containing a hologram of key information interposed in the path of said diffracted output beam to provide a modulated output beam;
   a transforming lens disposed in the path of said modulating output beam; and
   an image plane for receiving a point image of light from said modulated beam when correlation is secured between said key information and the image of a selected text of said information.

2. A system as in claim 1 in which said information is constituted of different font characteristics, and further including a font hologram disposed in proximity to said filter to enable correlation between said key information and corresponding selected text information regardless of the font characteristics of said corresponding selected text information.

3. A system as in claim 1 in which said coherent source has a frequency of $f_2$ for reading out the images stored in said coupler, said scan laser having a frequency $f_1$ for storing said images in said coupler, said first optical system further including a mode filter capable of providing selectively said frequency $f_2$ and a frequency $f_3$ for erasing the images stored in said coupler.